(12) United States Patent
Uemura (10) Patent No.: US 12,170,748 B2
(45) Date of Patent: Dec. 17, 2024

(54) IMAGE FORMING APPARATUS (71) Applicant: CANON KABUSHIKI KAISHA, Tokyo (JP)

(72) Inventor: Takuya Uemura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/510,304

(22) Filed: Nov. 15, 2023

(65) Prior Publication Data

US 2024/0171693 A1   May 23, 2024

(30) Foreign Application Priority Data

Nov. 18, 2022   (JP) .................... 2022-184527

(51) Int. Cl.
*H04N 1/00* (2006.01)
*G06F 3/044* (2006.01)

(52) U.S. Cl.
CPC ..... *H04N 1/00896* (2013.01); *H04N 1/00411* (2013.01); *H04N 1/00891* (2013.01); *G06F 3/044* (2013.01); *G06F 2203/04101* (2013.01)

(58) Field of Classification Search
CPC ........... H04N 1/00411; H04N 1/00251; H04N 1/00381; H04N 1/00469; H04N 1/00925; H04N 2201/0081; H04N 2201/0082; H04N 2201/0094; H04N 1/00397; H04N 1/00403; H04N 1/32058; H04N 13/395; H04N 13/398; H04N 2201/0089; H04N 2201/0093; B65H 2220/02; B65H 2402/60; B65H 2513/10; B65H 2801/27; B65H 29/12; G02B 2027/0138; G02B 2027/014; G02B 2027/0187; G02B 27/017; G02B 30/40; G02B 30/52; G06T 11/00; G06T 11/60; G06V 30/416
USPC ........................................................ 358/1.13
See application file for complete search history.

(56) References Cited

U.S. PATENT DOCUMENTS

| 8,355,578 | B2* | 1/2013 | Sohma ................. G06V 30/416 382/176 |
| 8,469,471 | B2* | 6/2013 | Kikuchi ............... B41J 2/17546 347/14 |
| 10,186,057 | B2* | 1/2019 | Shimura ............... G06T 11/203 |
| 11,068,108 | B2 | 7/2021 | Murayama |
| 2004/0161257 | A1* | 8/2004 | Ishihara ................. G06K 15/00 399/81 |
| 2011/0054360 | A1* | 3/2011 | Son ....................... A61B 5/1126 600/595 |

(Continued)

*Primary Examiner* — Negussie Worku (74) *Attorney, Agent, or Firm* — Canon U.S.A., Inc. I.P. Division (57) ABSTRACT

An image forming apparatus configured to form an image on a recording medium includes a display unit configured to perform display relating to a setting of image processing performed by the image forming apparatus, and a detection unit configured to detect a user's finger at a position separate from a surface of the display unit by a first distance in a vertical direction perpendicular to the surface of the display unit, and detect the user's finger at a position separate from the surface by a second distance longer than the first distance, wherein in a case where the display unit is in an off state, the display unit turns on when the detection unit detects the user's finger at the position separate from the surface by the second distance.

6 Claims, 5 Drawing Sheets

(56) References Cited

U.S. PATENT DOCUMENTS

| | | | |
|---|---|---|---|
| 2011/0205171 A1* | 8/2011 | Akiyoshi | G11B 27/34 345/173 |
| 2012/0113018 A1* | 5/2012 | Yan | G06F 3/04883 345/173 |
| 2012/0194545 A1* | 8/2012 | Shibata | G06F 3/0425 345/629 |
| 2013/0191784 A1* | 7/2013 | Noto | G06F 3/04883 715/834 |
| 2015/0227328 A1* | 8/2015 | Yokoyama | G03G 15/5016 358/1.14 |
| 2019/0286280 A1* | 9/2019 | Kuribayashi | G06F 3/0425 |
| 2021/0080885 A1* | 3/2021 | Akazawa | G03G 15/5091 |
| 2021/0271768 A1 | 9/2021 | Imayoshi | |
| 2024/0155061 A1* | 5/2024 | Suga | H04N 1/00896 |

* cited by examiner

IMAGE FORMING APPARATUS

BACKGROUND

Field

The present disclosure generally relates to an image forming apparatus including a touch input unit and a non-touch input unit.

Description of the Related Art

Conventionally, a touch operation, which is an operation performed by a user touching a touch panel or a button, has been widely used for an input device of an image forming apparatus. In such an input device of an image forming apparatus, there have been increasing demands that users want to operate an apparatus without touching a touch panel or a button because the touch operation can be a source of transmission of infectious agent. U.S. Pat. No. 11,068,108 discusses an input device that receives a non-touch operation that is to operate an apparatus without touching the input device.

Further, even with an image forming apparatus provided with an input device capable of receiving a non-touch input as discussed in U.S. Pat. No. 11,068,108, there may be a case where a touch operation needs to be performed to turn on a screen of the input device that has been turned off due to a sleep mode or the like. U. S. Patent Application Publication No. 2021/0271768 discusses a configuration using a human detection sensor, which allows an image forming apparatus to wake up from a sleep mode by a user just approaching the image forming apparatus.

As described above, in the image forming apparatus capable of receiving the non-touch operation, it is desirable to use a human detection sensor so that the screen of the input device that has been in an off state can be turned on without performing a touch operation.

However, with the image forming apparatus that is capable of receiving the non-touch operation, there may be a possibility that the configuration with the human detection sensor is more expensive than a case with no human detection sensor.

SUMMARY

In consideration of such an issue, the present disclosure is directed to image forming apparatuses capable of receiving non-touch operations and having an inexpensive configuration capable of easily turning on a screen of an input device that is in an off state with a non-touch operation.

According to some embodiments, an image forming apparatus configured to form an image on a recording medium includes a display unit configured to perform display relating to a setting of image processing performed by the image forming apparatus, and a detection unit configured to detect a user's finger at a position separate from a surface of the display unit by a first distance in a vertical direction perpendicular to the surface of the display unit, and detect the user's finger at a position separate from the surface by a second distance longer than the first distance, wherein in a case where the display unit is in an off state, the display unit turns on when the detection unit detects the user's finger at the position separate from the surface by the second distance.

Further features of the present disclosure will become apparent from the following description of exemplary embodiments with reference to the attached drawings.

DESCRIPTION OF THE EMBODIMENTS

Hereinbelow, with reference to the attached drawings, exemplary embodiments of the present disclosure will be described in detail. However, dimensions, materials, shapes, and relative arrangements of constituent parts described below are not intended to limit the range of the present disclosure thereto unless otherwise specifically described.

<Image Forming Apparatus>

Figure 1:
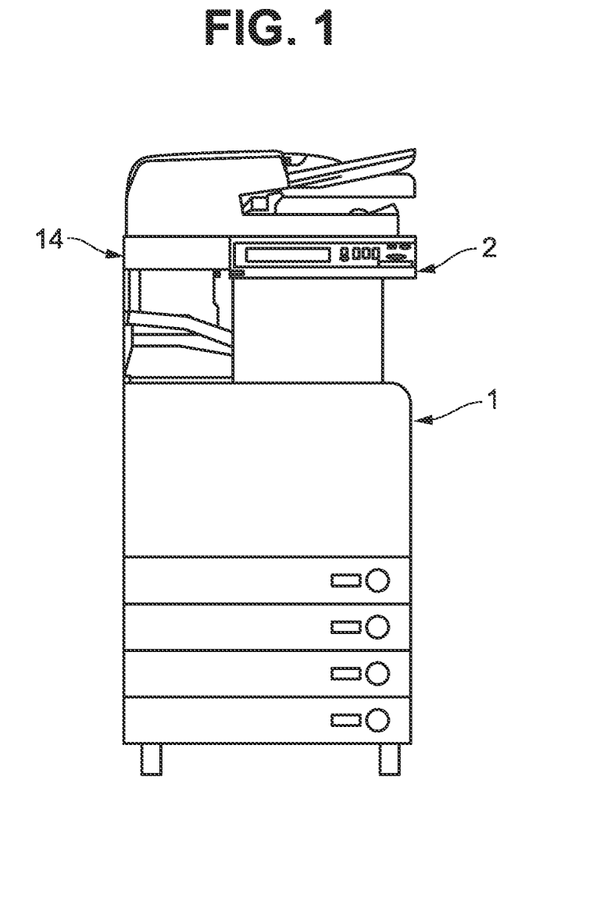
FIG. 1 is a diagram illustrating an example of an image forming apparatus.

With reference to FIG. 1, an image forming apparatus according to a first exemplary embodiment will be described. FIG. 1 is a diagram illustrating an example of an image forming system including the image forming apparatus.

As illustrated in FIG. 1, the image forming system includes an image forming apparatus 1 for forming an image on a sheet S (not illustrated), and a reader 14 for optically reading an image on a document placed on a glass plate (not illustrated) and converting the read image into image data. Further, a processing apparatus 16 (see FIG. 2), which performs various kinds of processing such as stapling processing, punching processing, and bookbinding processing, on sheets S with images formed thereon by the image forming apparatus 1, can be optionally added.

The image forming apparatus 1 includes a seesaw type or a tactile type power switch on its main body to switch a main power source on and off.

The image forming apparatus 1 is provided with an operation panel 2 including a display 21 (see FIG. 4) capable of displaying an image for display (display image) received from the image forming apparatus 1, and a touch panel 22 (see FIG. 4) for detecting a touch operation performed by a user. A user can make settings about an image forming operation such as the number of sheets for forming images thereon and a size of sheet S, and settings about an image reading operation such as a document size, by touching keys (input unit or buttons) displayed on the display 21 with their finger to perform input operations. Further, the operation panel 2 includes, other than the touch panel 22, a key-operation input unit 25 (see FIG. 3A) for a user to make settings and issue job instructions to the image forming apparatus 1.

The image forming apparatus 1 includes an image forming unit 15 (see FIG. 2) for forming an image on the sheet S. The image forming unit 15 includes photoconductive drums yellow (Y), magenta (M), cyan (C), and black (K), charging devices Y, M, C, and K, and developing devices Y, M, C, and K. Further, the image forming unit 15 includes primary transfer rollers Y, M, C, and K, laser scanner units Y, M, C, and K, an intermediate transfer belt, a secondary transfer roller, and a secondary transfer counter roller.

Figure 2:
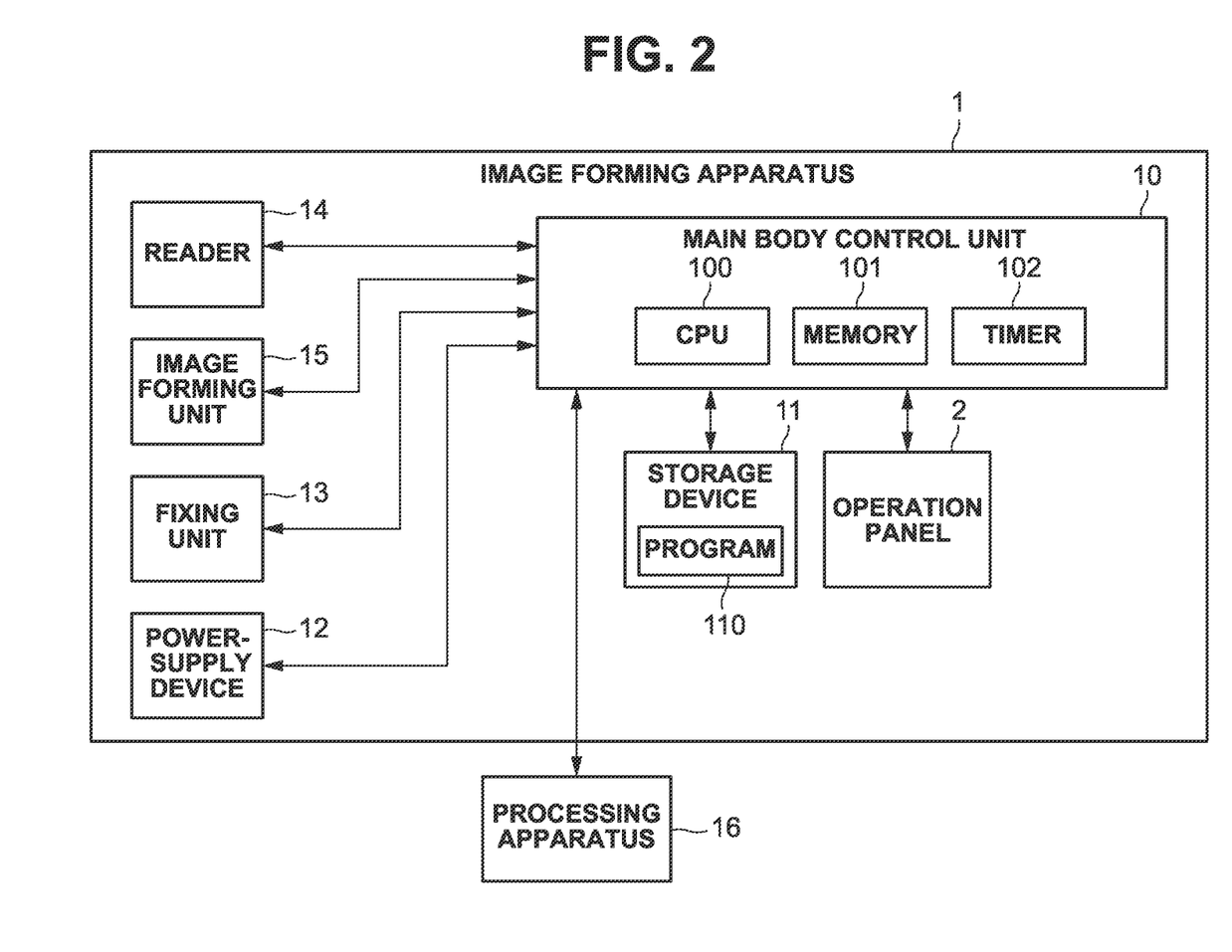
FIG. 2 is a block diagram illustrating an example of a system configuration of the image forming apparatus.

When the image forming apparatus 1 forms an image, first, an image forming job is input to a main body control unit 10 (see FIG. 2). Then, the sheet S stored in a sheet cassette is fed to a secondary transfer portion formed by the secondary transfer roller and the secondary transfer counter roller.

Meantime, in the image forming unit 15, first, the charging device Y charges the surface of the photosensitive drum Y. Then, the laser scanner unit Y irradiates the surface of the photosensitive drum Y with a laser beam, based on the image data of the document read by the reader 14, or image data transmitted from an external device (not illustrated) via a network, and forms an electrostatic latent image on the surface of the photosensitive drum Y.

Next, yellow toner is attached to the electrostatic latent image formed on the surface of the photosensitive drum Y by the developing device Y, so that a yellow toner image is formed on the surface of the photosensitive drum Y. The toner image formed on the surface of the photosensitive drum Y is primarily transferred onto the intermediate transfer belt by a primary transfer bias being applied to the primary transfer roller Y.

Through similar processes, magenta, cyan, and black toner images are formed on the photosensitive drums M, C, and K, respectively. Then, these toner images are transferred on the yellow toner image on the intermediate transfer belt in a superimposed manner when the primary transfer biases are applied to the primary transfer rollers M, C, and K. In this way, a full color toner image is formed on the surface of the intermediate transfer belt corresponding to an image signal.

Then, the intermediate transfer moves around its circumference to convey the full color toner image to the secondary transfer portion. Then, at the secondary transfer portion, the full color toner image on the intermediate transfer belt is transferred onto the sheet S when a secondary transfer bias is applied to the secondary transfer roller. The sheet S with the full color toner image transferred thereon is conveyed to a fixing unit 13 (see FIG. 2) by a conveyance belt. Then, at the fixing unit 13, the toner image is subjected to heat processing and pressurizing processing to be fixed on the sheet S.

Next, the sheet S with the toner image fixed thereon is conveyed to the processing apparatus 16. In a case where a user designates particular processing such as stapling processing, punching processing, and bookbinding processing, the sheet S conveyed to the processing apparatus 16 is subjected to the designated processing, and then discharged to a discharge tray. On the other hand, in a case where the user does not designate such processing or the processing apparatus 16 is not connected to the image forming apparatus 1, the sheet S is discharged to the discharge tray without being subjected to the processing.

<System Configuration of Image Forming Apparatus>

Next, with reference to FIG. 2, a system configuration of the image forming apparatus 1 will be described. FIG. 2 is a block diagram illustrating an example of a system configuration of the image forming apparatus 1.

As illustrated in FIG. 2, the image forming apparatus 1 is provided with the main body control unit 10 including a central processing unit (CPU) 100, a memory 101, and a timer 102. A storage device 11, the reader 14, the image forming unit 15, the operation panel 2 and other units are connected to the main body control unit 10. Further, the processing apparatus 16 can be added to the image forming apparatus 1 to expand the function as an option. The main body control unit 10 (CPU 100) can include one or more processors, circuitry, or combinations thereof and controls the operations of the connected units.

The reader 14 reads a document to generate image data. The image forming unit 15 performs image forming processing for forming an image on a sheet S based on the image data. The processing apparatus 16 performs processing such as stapling processing, punching processing, and bookbinding processing on printed materials, such as sheets S, subjected to the image forming processing.

The storage device 11 stores various kinds of programs 110 relating to the control of the image forming apparatus 1, various kinds of display images, and print data. In the present exemplary embodiment, the various kinds of programs 110 stored in the storage device 11 are a software group for the main body control unit 10 to perform various kinds of processing. Further, the various kinds of display images stored in the storage device 11 are display images (image data) to be displayed on the operation panel 2 and the like.

The CPU 100 reads and executes the programs 110 stored in the storage device 11. Further, the CPU 100 reads a display image to be displayed on the operation panel 2 from the storage device 11 and transmits the display image to the operation panel 2. The memory 101 temporarily stores data associated with the execution of the programs 110 by the CPU 100. More specifically, the CPU 100 performs the image forming processing on the sheet S by controlling the reader 14, the image forming unit 15, and the processing apparatus 16 connected to the main body control unit 10, using the memory 101 as a work area based on the programs 110 stored in the storage device 11. For example, the CPU 100 performs the image processing on the image data read by the reader 14 from the document, based on the programs 110. The CPU 100 stores the image data generated in this way in the storage device 11, and transfers the image data to the image forming unit 15 to perform the image forming processing.

The timer 102 is a timer for measuring time when the main body control unit 10 performs various kinds of processing. For example, the main body control unit 10 determines whether to shift the image forming apparatus 1 from a stand-by mode to a screen-off mode consuming little power, based on the count value of the timer 102. After shifting the image forming apparatus 1 to the screen-off mode, the main body control unit 10 further determines whether to shift the image forming apparatus 1 from the screen-off mode to a sleep mode consuming little power, based on the count value of the timer 102. Further, the main body control unit 10 may perform processing of shifting the image forming apparatus 1 to the sleep mode consuming power less than the stand-by mode directly not via the screen-off mode. The stand-by mode corresponds to a first power mode. In addition, the screen-off mode and the sleep mode correspond to a second power mode.

Further, a power-supply device 12 is connected to the main body control unit 10. The power-supply device 12 receives power from a commercial power supply via a power supply plug, converts the received power into power to be used by each unit in the image forming apparatus 1, and supplies the converted power to each unit.

<Power Modes of Image Forming Apparatus>

In the image forming apparatus 1, the main body control unit 10 (CPU 100) performs control to reduce power consumption depending on an operation mode.

The image forming apparatus 1 can shift from the stand-by mode (first power mode) to the screen-off mode (second power mode) consuming less power than the stand-by mode. The image forming apparatus 1 can further shift to the sleep mode (third power mode) consuming power less than the screen-off mode.

When the image forming apparatus 1 is in the stand-by mode, the power-supply device 12 supplies power to the main body control unit 10. Then, the power-supply device 12 supplies power to the reader 14, the image forming unit 15, the processing apparatus 16, and the operation panel 2, based on the instruction from the main body control unit 10. Even in the stand-by mode, based on the instruction from the main body control unit 10, the power-supply device 12 supplies power to the devices that are used and does not supply power to the devices that are not used. For example, when a user selects an image reading operation, the power-supply device 12 supplies power to the reader 14, but does not supply power to the image forming unit 15 and the processing apparatus 16.

In a case where the image forming apparatus 1 is not used for a predetermined time, the image forming apparatus 1 shifts from the stand-by mode to the screen-off mode consuming less power than the stand-by mode. In the screen-off mode, the back light or the screen display of the display 21 of the operation panel 2 is turned off based on the instruction from the main body control unit 10, thereby reducing the power consumption of the image forming apparatus 1. In a case where the image forming apparatus 1 is not used for even longer period, the image forming apparatus 1 shifts to the sleep mode consuming less power than the screen-off mode. Further, in a case where the image forming apparatus 1 receives an instruction from a user via the operation panel 2 to shift to the sleep mode, the image forming apparatus 1 shifts to the sleep mode. When the image forming apparatus 1 shifts from the stand-by mode to the sleep mode, the power-supply device 12 stops supplying power to the reader 14, the image forming unit 15, and the processing apparatus 16, which are supplied power from the power-supply device 12 in the stand-by mode, based on an instruction from the main body control unit 10. Based on the instruction of the main body control unit 10, the back light or the screen display of the display 21 of the operation panel 2 is turned off to reduce power consumption.

When the operation panel 2 detects an input from a user in the screen-off mode or the sleep mode, the image forming apparatus 1 returns to the stand-by mode from the screen-off mode or the sleep mode. Also, when the operation panel 2 receives from a user an instruction to wake up from the sleep mode during the sleep mode, the image forming apparatus 1 also returns to the stand-by mode.

Configuration of Operation Panel>

Figure 3A:
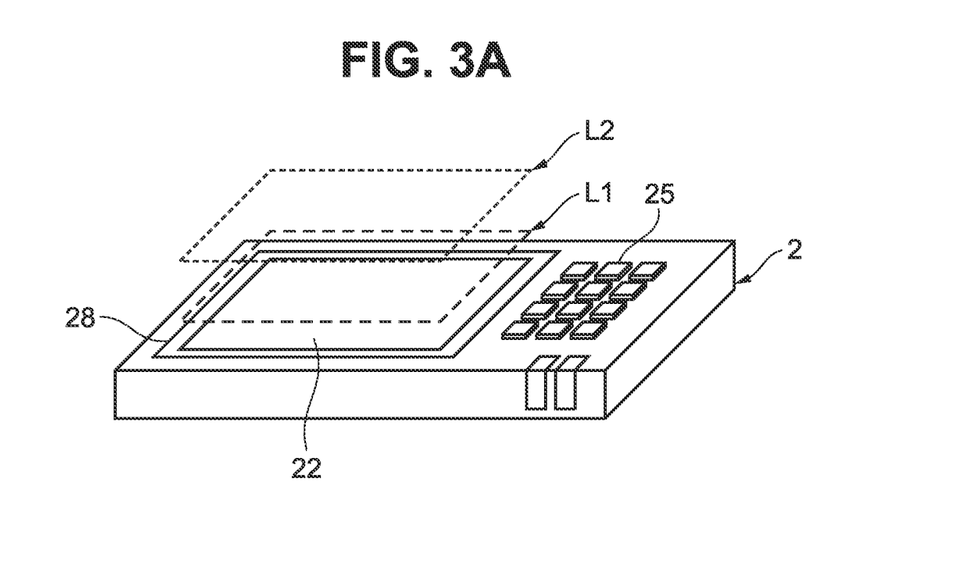
FIGS. 3A and 3B are diagrams illustrating a user operation detection position in each mode of an operation panel.
Figure 3B:
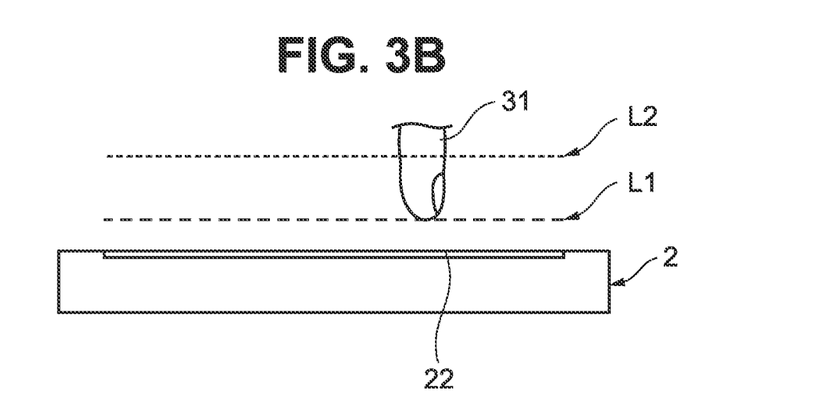
Figure 4:
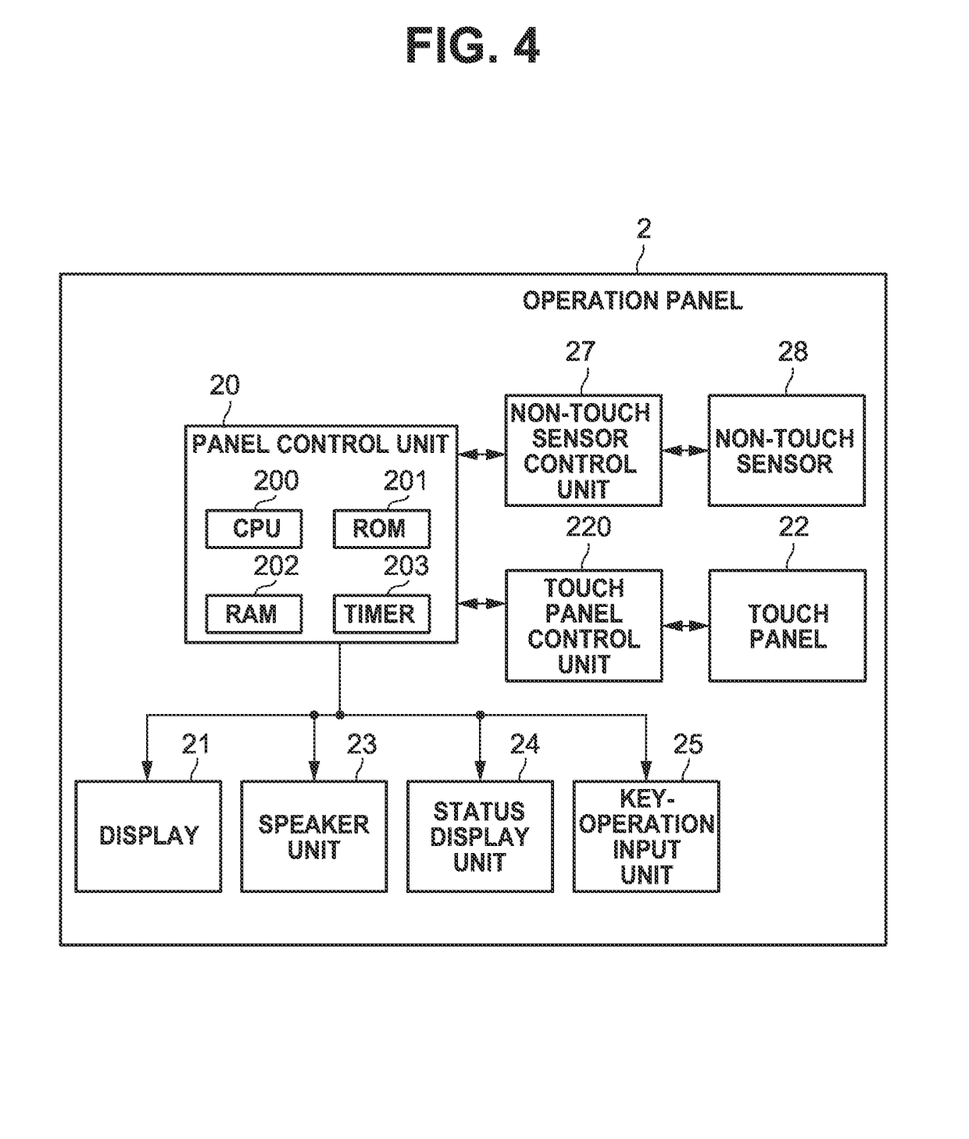
FIG. 4 is a block diagram illustrating an example of a system configuration of the operation panel.

Next, with reference to FIGS. 3A, 3B, and 4, a configuration of the operation panel 2 will be described. FIG. 4 is a block diagram illustrating an example of a system configuration of the operation panel 2.

As illustrated in FIG. 4, the operation panel 2 is provided with a panel control unit 20 including a CPU 200, a read only memory (ROM) 201, a random access memory (RAM) 202, and a timer 203. The timer 203 measures time when the panel control unit 20 performs various kinds of processing.

The ROM 201 (memory unit) stores data such as various kinds of programs relating to the control of the operation panel 2. The CPU 200 can include one or more processors, circuitry, or combinations thereof and executes various kinds of calculation processing based on the control programs stored in the ROM 201. The RAM 202 temporarily stores data. More specifically, the CPU 200 controls the display 21, a speaker unit 23, and a status display unit 24 connected to the panel control unit 20 using the RAM 202 as a work area, based on the control programs stored in the ROM 201.

Further, the ROM 201 is a memory unit storing information relating to controls described below. The ROM 201 stores information relating to the connection to the image forming apparatus 1, in addition to the various kinds of programs relating to the control of the operation panel 2. The information relating to the controls includes information indicating that a connection with the image forming apparatus 1 is established, and information obtained from the image forming apparatus 1. Examples of the information obtained from the image forming apparatus 1 include information relating to the status of the image forming apparatus 1 such as the stand-by mode, the sleep mode, and an error detection, and count information such as the number of printed sheets.

The display 21 is a display unit capable of displaying information stored in the ROM 201 (memory unit) in advance, or information received from the main body control unit 10. Accordingly, the CPU 200 can switch the image to be output to the display 21 between the image stored in the operation panel 2 and the image received from the main body control unit 10.

Further, the touch panel 22, which is an operation unit that detects a touch operation performed by a user, is arranged on the display 21 in a superimposed manner, and the user can operate the image forming apparatus 1 by touching the display 21 with their finger 31 via the touch panel 22. The display 21 displays the screen to the user through the touch panel 22. That is, the display 21 and the touch panel 22 correspond to a display unit. The touch panel 22 is connected to the panel control unit 20 via a touch panel control unit 220 to detect a position at which the user input an instruction on the display 21. The touch panel control unit 220 generates third detection information indicating that a user's finger 31 touches the touch panel 22, and second position information indicating a position on the display 21 where the user inputs the instruction, and transmits the generated information to the panel control unit 20. That is, the touch panel 22 and the touch panel control unit 220 correspond to a second generation unit.

Further, the operation panel 2 includes the key-operation input unit 25 provided separately from the touch panel type display 21 serving as an operation display unit. The key-operation input unit 25 is hardware keys provided in an area outside the display 21 of the operation panel 2. The key-operation input unit 25 includes a numeric keypad and a key used to start a job of the image forming apparatus 1.

Further, the operation panel 2 includes a non-touch sensor 28. When the display 21 is in the on state, the non-touch sensor 28 unit can detect the user's finger 31 on a detection plane L1 separate from the surface of the touch panel 22 by a first distance in a vertical direction perpendicular to the surface of the touch panel 22. In addition, the detection plane L1 is a surface parallel to the surface of the touch panel 22. A non-touch sensor control unit 27 is connected to the panel control unit 20, and generates first detection information upon the detection of the user's finger 31 by the non-touch sensor 28 on the detection plane L1 and first position information indicating the position of the user's finger 31 detected on the detection plane L1, and transmits the first detection information and the first position information to the panel control unit 20. That is, the non-touch sensor 28 and the non-touch sensor control unit 27 correspond to a detection unit.

The operation mode on the touch panel 22 can be switched between a touch operation mode and a non-touch operation mode by according to an instruction from the panel control unit 20 to the touch panel control unit 220 or the non-touch sensor control unit 27. The switching of the operation mode can be performed using, for example, a touch panel of an electrostatic capacitance method. The touch panel of the electrostatic capacitance method can detect the user's finger 31 based on a change in the electrostatic capacitance.

Further, the non-touch sensor 28 can detect the user's finger 31 on a detection plane L2 separate from the surface of the touch panel 22 by a second distance, which is farther than the first distance. In a case where the display 21 is in an off state, the non-touch sensor 28 detects the user's finger 31 on the detection plane L2. Details thereof will be described below. In a case where the non-touch sensor 28 detects the user's finger 31 on the detection plane L2, the non-touch sensor control unit 27 transmits second detection information indicating the detection of the user's finger 31 to the CPU 100. The CPU 100 turns on the display 21 that is in the off state based on the second detection information transmitted from the non-touch sensor control unit 27. Since the detection plane L2 is farther from the surface of the operation panel 2 than the detection plane L1 in the vertical direction perpendicular to the surface of the touch panel 22, the non-touch sensor 28 can detect the user's finger 31 at a position far from the display surface, compared to the detection plane L1. The detection of the user's finger 31 on the detection plane L1 is assumed to be an operation performed when the display 21 is in the on state. For this reason, the first distance is set to be relatively close to the surface of the display 21 (e.g., 5 to 10 cm from the surface of the display 21) so as to be able to distinguish an operation performed by a user who intends to perform the non-touch operation the non-touch operation from an operation performed by a user who does not intend to perform the non-touch operation. In this case, the user needs to move their finger close to the surface of the display 21 to turn on the screen in the off state by the non-touch operation, which can hardly be said user friendly.

On the other hand, since the detection plane L2 is assumed to detect the user's finger 31 at a position relatively far from the surface of the display 21, the second distance is set, for example, to a distance of 50 cm or more from the surface of the display 21. In this way, the user can turn on the screen just by holding the user's hand over the display 21, and the user can turn on the screen more easily than a case where the non-touch sensor 28 detects the user's finger 31 on the detection plane L1.

Operation Detection Flow in First Exemplary Embodiment

Figure 5:
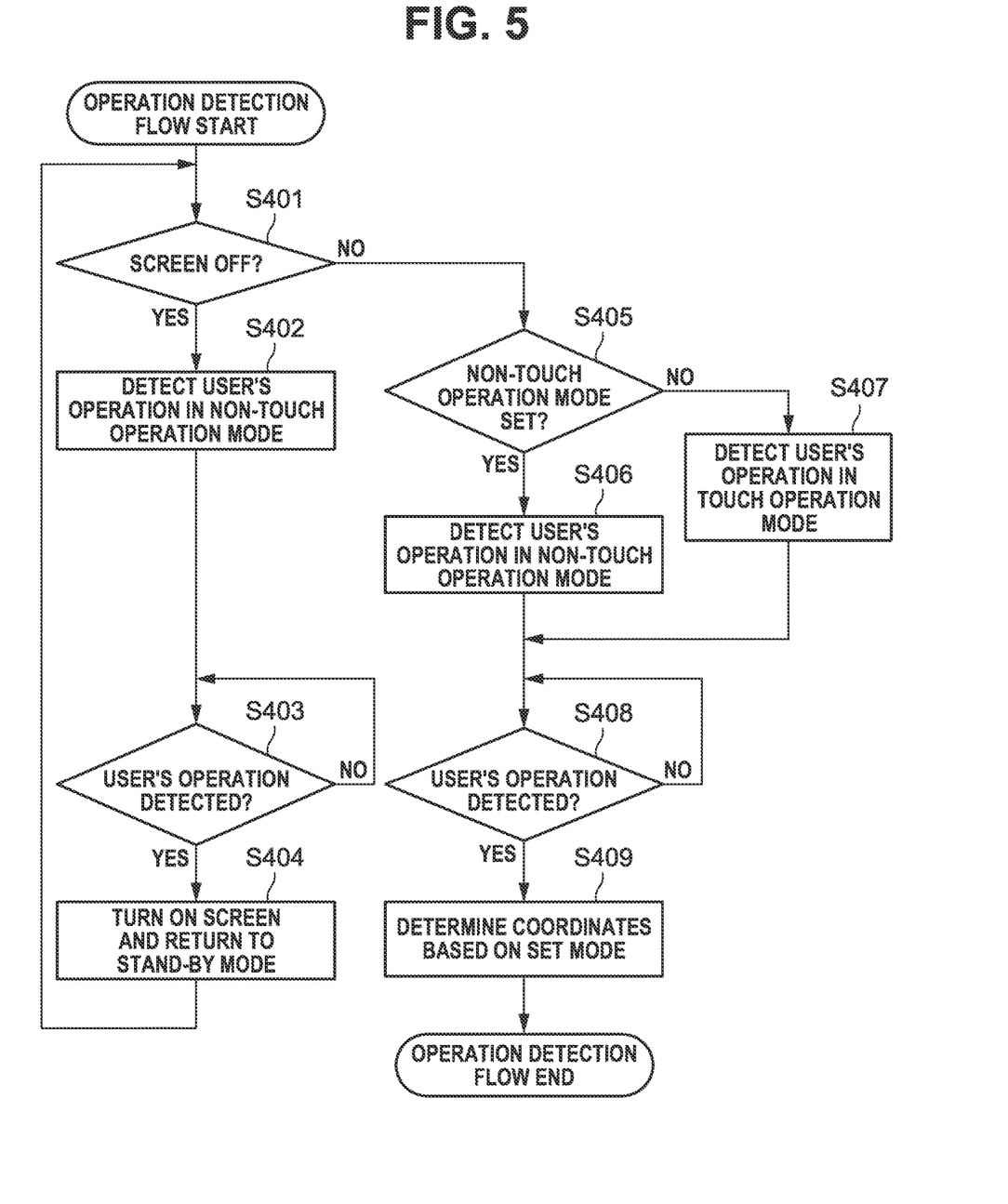
FIG. 5 is a flowchart illustrating an operation detection flow.

Next, the control for detecting the user's operation on the touch panel 22, which is a feature of the present disclosure, will be described. FIG. 5 is a flowchart illustrating processing of detecting the user's operation, which is executed by the CPU 100 of the main body control unit 10, according to the first exemplary embodiment.

Assume that the image forming apparatus 1 has been activated by the user and is in a state where the touch operation mode (second detection mode) or the non-touch operation mode (first detection mode) is set in the touch panel control unit 220 of the operation panel 2.

In step S401, the CPU 100 determines whether the screen of the display 21 is in an off state (off). If the image forming apparatus 1 is in the stand-by mode, the screen is in an on state (on). If the image forming apparatus 1 is in the screen-off mode or the sleep mode, the screen is off. In a case where the screen of the display 21 is off (YES in step S401), the processing proceeds to step S402. In a case where the screen of the display 21 is on (NO in step S401), the processing proceeds to step S405.

The processing performed in step S402 to be described from now is a characteristic step of the present disclosure. In the case where the screen of the display 21 is off (Yes in step S401), the in step S402, the CPU 100 instructs the operation panel 2 to set the non-touch operation mode (first detection mode). In response to receipt of the instruction, the CPU 200 in the operation panel 2 transmits to the touch panel control unit 220 a command to set the touch panel 22 to the non-touch operation mode (first detection mode). Before turning off the screen, the CPU 200 sets the touch panel 22 to the non-touch operation mode (first detection mode), regardless of whether the touch panel 22 is set in the touch operation mode (second detection mode) or the non-touch operation mode (first detection mode). This setting is performed considering that a user who does not want to touch the touch panel 22 can start operating the image forming apparatus 1 without touching the touch panel 22. Since the display 21 is off, the non-touch sensor 28 detects the user's finger 31 on the detection plane L2.

In step S403, the CPU 100 determines whether the touch panel 22 detects the user's operation in the non-touch operation mode (first detection mode). When the user's finger 31 reaches the detection plane L2 of the touch panel 22, the touch panel 22 detects the user's operation. Then, the touch panel 22 notifies the CPU 100 via the CPU 200 that the user's operation is performed. When the CPU 100 detects the user's operation (YES in step S403), the processing proceeds to step S404. When the CPU 100 does not detect the user's operation (NO in step S403), the processing returns to step S403.

In step S404, the CPU 100 performs control to turn on the screen of the display 21 of the operation panel 2, and return to the stand-by mode. Before turning off the screen, the CPU 100 sets the touch panel 22 to the non-touch operation mode (first detection mode), regardless of whether the touch panel 22 is set to the touch operation mode (second detection mode) or the non-touch operation mode (first detection mode). This setting is performed because the priority is given to a user who does not want to touch the touch panel 22 so that the user can continue the operation without touching the touch panel 22, but the operation panel 2 may be shifted to the touch operation mode after the screen of the display 21 is turned on by the non-touch operation. Then, the processing returns to step S401.

In a case where the CPU 100 determines that the screen of the display 21 is not off (NO in step S401), the processing proceeds to step S405. In step S405, the CPU 100 determines which of the touch operation mode (second detection mode) and the non-touch operation mode (first detection mode) the operation panel 2 is instructed to be set to by the user. If the CPU 100 determines that the operation panel 2 is instructed by the user to be switched to the non-touch operation mode (first detection mode) (YES in step S405), the processing proceeds to step S406. On the other hand, if the CPU 100 determines that the operation panel 2 is instructed by the user to be switched to the touch operation mode (second detection mode) (NO in step S405), the processing proceeds to step S407. The user can issue an instruction regarding whether to set the operation panel 2 to the touch operation mode or the non-touch operation mode via the operation panel 2.

In step S406, the CPU 100 instructs the operation panel 2 to set the operation panel 2 to the non-touch operation mode (first detection mode). In response to receipt of the instruction, the CPU 200 in the operation panel 2 transmits to the touch panel control unit 220 a command to set the operation panel 2 to the non-touch operation mode (first detection mode). Then, the processing proceeds to step S408. In step S407, the CPU 100 instructs the operation panel 2 to set the operation panel 2 to the touch operation mode (second detection mode). In response to receipt of the instruction, the CPU 200 in the operation panel 2 transmits to the touch panel control unit 220 a command to set the operation panel 2 to the touch operation mode (second detection mode). Then, the processing proceeds to step S408. In step S408, the CPU 100 determines whether a user's operation is detected. If a user's operation is not detected (NO in step S408), the processing returns to step S408. If a user's operation is detected (YES in step S408), the processing proceeds to step S409. In step S408, in a case where the operation panel 2 is set to the non-touch operation mode (first detection mode), the operation is detected on the detection plane L1 of the touch panel 22. In step S408, in a case where the operation panel 2 is set to the touch operation mode (second detection mode), the operation is detected on the surface of the touch panel 22.

In step S409, the CPU 100 determines coordinates instructed by the user based on the setting mode of the operation panel 2. In a case where the operation panel 2 is set to the non-touch operation mode (first detection mode), the coordinates where the operation instruction is performed on the detection plane L1 of the touch panel 22 are detected. In the case where the operation panel 2 is set to the touch operation mode (second detection mode), the coordinates where the operation instruction is performed on the surface of the touch panel 22 are detected. Based on the detected coordinates, an appropriate operation instruction is performed on the image forming apparatus 1. Then, the operation detection flow is ended. In a case where the next detection flow is to be started, the processing returns to step S401.

According to the present exemplary embodiment, as described above, when the display is in the off state, the display in the off state can easily be turned on with a non-touch input, by detecting the user's finger is detected on the detection plane L2 farther from the display surface than the detection plane L1 on which the user's finger is detected when the display is in the on state.

According to the present disclosure, it is possible to provide image forming apparatuses capable of receiving non-touch operations and having an inexpensive configuration capable of easily turning on a screen of an input device in an off state with a non-touch operation.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-184527, filed Nov. 18, 2022, which is hereby incorporated by reference herein in its entirety.

What is claimed is:

1. An image forming apparatus configured to form an image on a recording medium, the image forming apparatus comprising:
  a display unit configured to perform display relating to a setting of image processing performed by the image forming apparatus;
  a detection unit configured to detect a user's finger at a position separate from a surface of the display unit by a first distance in a vertical direction perpendicular to the surface of the display unit, and detect the user's finger at a position separate from the surface by a second distance longer than the first distance; and
  a control unit configured to control the display unit to turn on and off,
  wherein in a case where the display unit is in an off state, the detection unit detects the user's finger at the position separate from the surface of the display unit by the second distance in the vertical direction, and
  wherein in a case where the detection unit detects the user's finger at the position separate from the surface of the display unit by the second distance in the vertical direction, the control unit controls the display unit in the off state to turn on.

2. The image forming apparatus according to claim 1, wherein the detection unit generates first detection information when the detection unit detects the user's finger at the position separate from the surface by the first distance in the vertical direction, and generates second detection information when the detection unit detects the user's finger at the position separate from the surface by the second distance in the vertical direction, and
  wherein the control unit controls the display unit to turn on based on the second detection information.

3. The image forming apparatus according to claim 1, wherein the image forming apparatus is configured to shift between a first power mode in which image forming is performable and a second power mode consuming less power than the first power mode, and
  wherein the display unit turns off when the image forming apparatus is in the second power mode.

4. The image forming apparatus according to claim 1, wherein the detection unit detects the user's finger at the position separate from the surface by the first distance in the vertical direction and generates position information indicating a position of the user's finger on a plane parallel to the surface, and
  wherein a setting relating to image forming is performed based on the position information.

5. The image forming apparatus according to claim 1, wherein the detection unit detects the user's finger at the position separate from the surface by the first distance in the vertical direction and at the position separate from the surface by the second distance in the vertical direction, based on a change in electrostatic capacitance.

6. The image forming apparatus according to claim 1, wherein, in a case where the display unit is in an on state, the detection unit detects the user's finger at the position separate from the surface of the display unit by the first distance in the vertical direction.

* * * * *